United States Patent
Steg et al.

(10) Patent No.: US 10,343,374 B2
(45) Date of Patent: Jul. 9, 2019

(54) ASSEMBLY FOR VIBRATION ISOLATION OF A ROTATABLE MASS

(71) Applicant: Blue Canyon Technologies LLC, Boulder, CO (US)

(72) Inventors: Stephen Steg, Erie, CO (US); Bryce Peters, Longmont, CO (US)

(73) Assignee: Blue Canyon Technologies Inc., Boulder, CO (US)

( * ) Notice: Subject to any disclaimer, the term of this patent is extended or adjusted under 35 U.S.C. 154(b) by 469 days.

(21) Appl. No.: 15/063,370

(22) Filed: Mar. 7, 2016

(65) Prior Publication Data

US 2016/0341273 A1 Nov. 24, 2016

Related U.S. Application Data

(60) Provisional application No. 62/165,531, filed on May 22, 2015.

(51) Int. Cl.
*B32B 7/08* (2019.01)
*F16F 15/02* (2006.01)
*F16F 7/08* (2006.01)

(52) U.S. Cl.
CPC ............... *B32B 7/08* (2013.01); *F16F 7/08* (2013.01); *F16F 15/022* (2013.01); *B32B 2307/56* (2013.01); *B32B 2605/18* (2013.01)

(58) Field of Classification Search
CPC ... B32B 7/08; B32B 2307/56; B32B 2605/18; F16F 15/022; F16F 7/08; F16F 1/324; F16F 1/326; F16M 13/02; Y10T 464/50
USPC ........................................ 267/160, 161, 163
See application file for complete search history.

(56) References Cited

U.S. PATENT DOCUMENTS

| | | | |
|---|---|---|---|
| 3,019,662 A | 2/1962 | Gahn | |
| 4,213,661 A | 7/1980 | Marmol | |
| 4,322,984 A | 4/1982 | Lasker et al. | |
| 4,606,239 A | 8/1986 | Guerin | |
| 4,872,357 A | 10/1989 | Vaillant De Guelis et al. | |
| 5,390,554 A | 2/1995 | Silvent | |
| 5,474,263 A | 12/1995 | Ford et al. | |
| 5,781,379 A * | 7/1998 | Erpelding | G11B 5/486 360/245.3 |
| 5,820,079 A | 10/1998 | Harrell | |
| 6,202,961 B1 | 3/2001 | Wilke et al. | |
| 7,249,756 B1 | 7/2007 | Wilke et al. | |
| 8,089,199 B2 * | 1/2012 | Shu | F16D 3/79 310/328 |
| 8,726,762 B2 | 5/2014 | Rogers et al. | |

(Continued)

OTHER PUBLICATIONS

W. Auer, Test Results and Flight Experience of Ball Bearing Momentum and Reaction Wheels, 1990, NASA Technical Reports Server, http://hdl.handle.net/2060/19900012783.

*Primary Examiner* — Amber R Anderson
*Assistant Examiner* — Nahid Amiri
(74) *Attorney, Agent, or Firm* — The Ollila Law Group LLC

(57) ABSTRACT

An assembly for coupling a rotatable mass to a body including a flexure layer, and a method for assembling and manufacturing the same. The flexure layer includes an inner region operable to be coupled to the rotatable mass via a bearing assembly, an outer region operable to be coupled to the body, and a flexure element including a first end coupled to the inner region and a second end coupled to the outer region.

18 Claims, 11 Drawing Sheets

(56) References Cited

U.S. PATENT DOCUMENTS

| | | | |
|---|---|---|---|
| 9,285,073 B2* | 3/2016 | Ellis | F16F 1/324 |
| 9,382,942 B2* | 7/2016 | Sakon | F16O 35/063 |
| 9,500,245 B2* | 11/2016 | Klassen | A43B 13/181 |
| 2004/0041315 A1* | 3/2004 | Noe | F16F 1/326 |
| | | | 267/136 |
| 2012/0159810 A1* | 6/2012 | Klassen | A43B 13/181 |
| | | | 36/28 |
| 2013/0009415 A1* | 1/2013 | Goodman | H01L 21/67092 |
| | | | 294/188 |
| 2013/0328337 A1* | 12/2013 | Melcher | F16F 7/104 |
| | | | 296/1.03 |
| 2015/0041619 A1* | 2/2015 | Ellis | F16F 1/324 |
| | | | 248/603 |
| 2016/0158933 A1* | 6/2016 | Taylor | B81B 3/0048 |
| | | | 74/479.01 |
| 2017/0027279 A1* | 2/2017 | Klassen | A43B 13/181 |
| 2017/0181276 A1* | 6/2017 | Sawada | B32B 3/266 |

* cited by examiner

ASSEMBLY FOR VIBRATION ISOLATION OF A ROTATABLE MASS

CROSS-REFERENCE TO RELATED APPLICATION

This Application claims priority from U.S. Provisional Patent Application No. 62/165,531 filed May 22, 2015, entitled, "Assembly for Vibration Isolation of a Rotatable Mass," the contents of which are incorporated herein by reference.

TECHNICAL FIELD

The present Application is directed towards rotatable mass systems, and more particularly to an assembly to isolate vibrations to and from a rotatable mass system.

BACKGROUND

During the launch of a spacecraft, reaction wheel bearings are subjected to very high vibration loads. These loads are a combination of static acceleration, acoustic, random vibration, sinusoidal vibration, and shock. Additionally, resonant frequencies within the spacecraft and reaction wheel structure may cause significant amplification, resulting in very high loads being exerted on the reaction wheel bearings. While it is possible to use large bearings to react these high vibration loads, large bearings carry a penalty of significant increase in viscous drag and therefore have a much higher power consumption. On spacecraft mass, power, and volume are precious resources, and therefore simply using larger bearings is not an optimal solution.

Spacecraft with 3-axis control typically use 3 or more (for redundancy) reaction wheels, so increasing mass and power consumption of a single reaction wheel has a 3 or 4 times penalty for the spacecraft. All power on a spacecraft is typically generated with solar arrays and batteries, and these are large and heavy, so it is critical to minimize the mass and power consumption of spacecraft components including the reaction wheels.

If small bearings are used to support the reaction wheel assembly, the spacecraft will benefit from minimal power consumption, and the overall system mass will be minimized. However, for a given launch vibration load, small bearings have lower load capacity and therefore will experience high stresses, which can damage the bearings and result in a premature failure of both the reaction wheel and the spacecraft.

It is desirable to minimize loading on the reaction wheel ball bearings. Several different approaches have been applied to solve the problem, but none of the prior approaches have provided a satisfactory solution.

Prior methods have included restraining the heavy rotor of the reaction wheel assembly using a mechanism for axially clamping the rotor to the housing. Other previous methods have been used to capture the rotor web or rim. These offloading and restraint methods all require mechanisms for release, however, and therefore add complexity, mass, and failure modes to the reaction wheel.

Other prior methods have attempted to minimize vibration loading on bearings by tuning the vibration response of the rotor, such that it acts as a tuned-mass-damper. Tuned-mass-dampers require extra mass and volume, and in practice they rely on exact knowledge of the as-built mass properties and vibration response of the rotor and structure. Small errors in the mass properties or stiffness prevent this method from working effectively.

Other prior solutions utilized in the industry have provided off-loading of the rotor mass through the presence of "snubbers". Snubbers are structural supports that are located very close (i.e. 0.010" or less) to the rotor. When the rotor is subjected to launch loading, the rotor deflects axially and radially and the small clearance ("snub gap") becomes zero, thereby transmitting the rotor load to the structure and offloading the rotor load from the bearings. Snubbers are difficult and expensive to successfully use in practice, however, and the very small snub gaps are potential failure modes of the reaction wheel. Small particulates can jam in the small gap, preventing wheel rotation, and causing a catastrophic failure. Furthermore, if small variations in the as-manufactured parts are present, this snub gap could be a different size than expected, potentially creating further failure modes. Too large of a gap may result in ineffective off-loading of the bearings, and too small of a gap could be susceptible to failure. Lastly, it is not unusual for launch vibrations to cause small shifts in bolted interfaces of structures. If this happens, it is possible that a small snub gap could become a source of rubbing, friction, and failure of the reaction wheel. Offloading the reaction wheel through the use of very small snub gaps is therefore expensive to accomplish and risky.

Other prior solutions have integrated fluid viscous damping into the bearing support. While viscous damping may be viable for terrestrial applications, damping fluids are not compatible with the vacuum environment of space, however.

What is needed is a reliable way to isolate vibrations between a body to which a reaction wheel housing is attached and the reaction wheel bearings.

SUMMARY

An assembly for coupling a rotatable mass to a body is provided. The assembly includes an inner region operable to be coupled to the rotatable mass via a bearing and an outer region operable to be coupled to the body. The assembly further includes a flexure element including a first end coupled to the inner region and a second end coupled to the outer region.

A method for manufacturing a flexure layer operable to isolate vibrations between a rotatable mass and a body is provided. The method includes forming a flexure layer. The method further includes removing material from the flexure layer to form a flexure element, the flexure element including a first end coupled to an inner region of the flexure element and a second end coupled to an outer region of the flexure element.

A method for coupling a rotatable mass to a body is provided. The method includes coupling an inner region of a flexure layer to a rotatable body. The flexure layer includes the inner region, a flexure element, and an outer region. The flexure element has a first end coupled to the inner region and a second end coupled to the outer region. The method further includes coupling the outer region to the body.

DETAILED DESCRIPTION

FIGS. 1-12b and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

The equivalent loading of an assembly subjected to random vibration may be approximated in a single degree of freedom by Miles' Equation:

$$Grms = \sqrt{\left(\frac{\pi}{4} * \frac{fn}{\zeta} * ASDinput\right)} \quad \text{(Equation 1)}$$

where:
Grms=Root Mean Square Acceleration in G's
fn=Natural Frequency (Hz)
$\zeta$=Critical Damping Ratio
ASDinput=Acceleration Spectral Density, in units of $$\frac{g^2}{Hz}.$$

As it may be seen from Equation 1, lowering the resonant frequency fn, will lower the Grms loading into the bearings. Furthermore, it can be seen from Equation 1 that increasing the critical damping ratio will also lower the Grms loading into the bearings. By lowering loads on the bearings, it may be possible to use smaller bearings, which have lower drag torque and lower power consumption.

The present Application describes example assemblies for coupling a rotatable mass to a body. The example assemblies may include a flexure element and/or a damping element that may be configured to provide flexibility and damping to the assembly, changing the natural frequency fn of the assembly in any one or combination of six degrees of freedom. Three degrees of freedom represent translations about the X, Y, and Z axes, and an addition 3 degrees of freedom represent rotations about the three orthogonal directions.

While examples of reaction wheel assemblies are provided in the Application, this is not intended to be limiting. Those of skill in the art will readily understand that the examples may be applied to other types of rotatable masses as well. For example, the assembly described in the present Application may be applied to gyroscopes.

Figure 1:
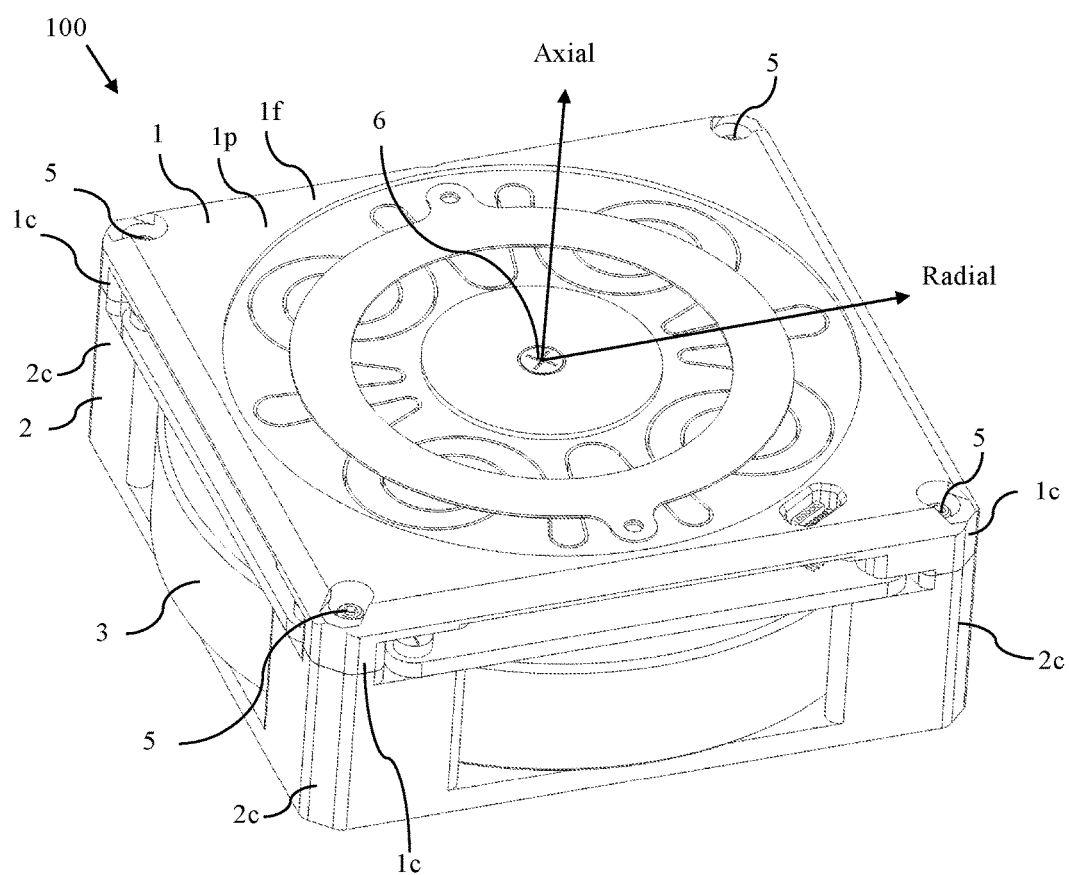
FIG. 1 depicts a perspective view of a top of a reaction wheel assembly, in accordance with an example.
Figure 2:
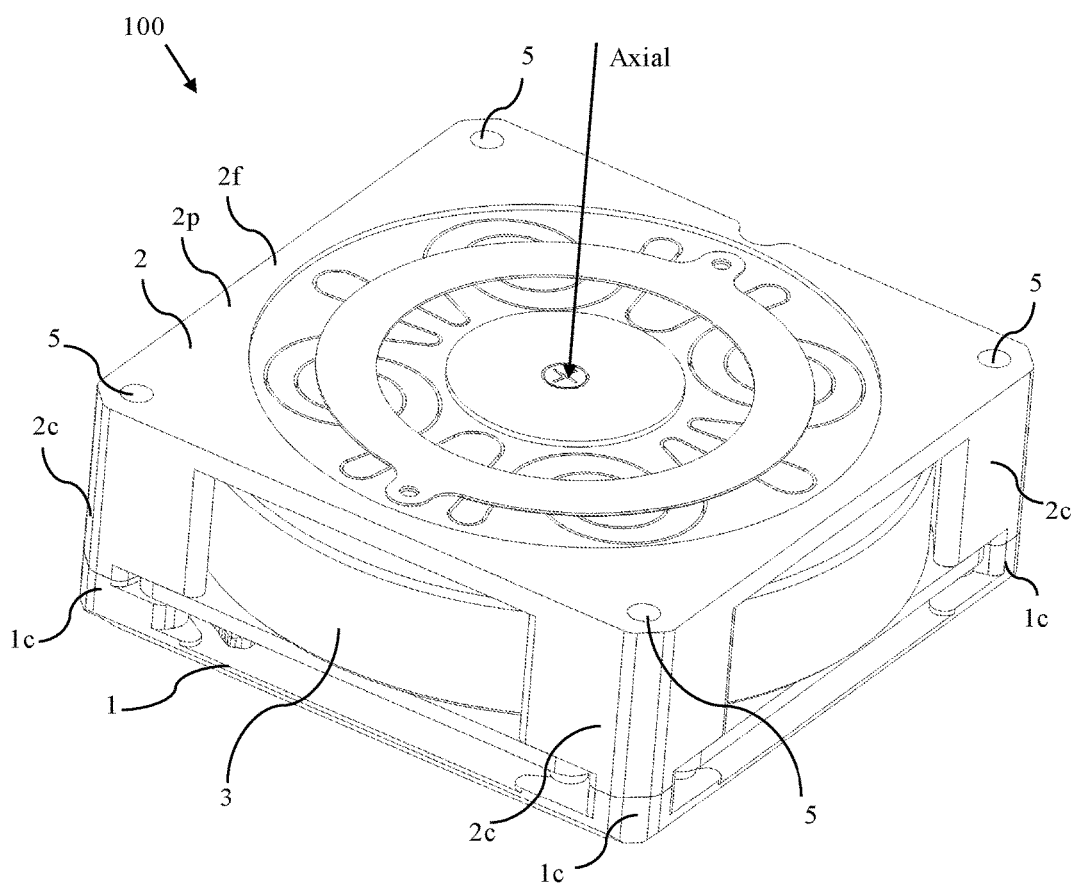
FIG. 2 depicts a perspective view of a bottom of a reaction wheel assembly, in accordance with an example.
Figure 3:
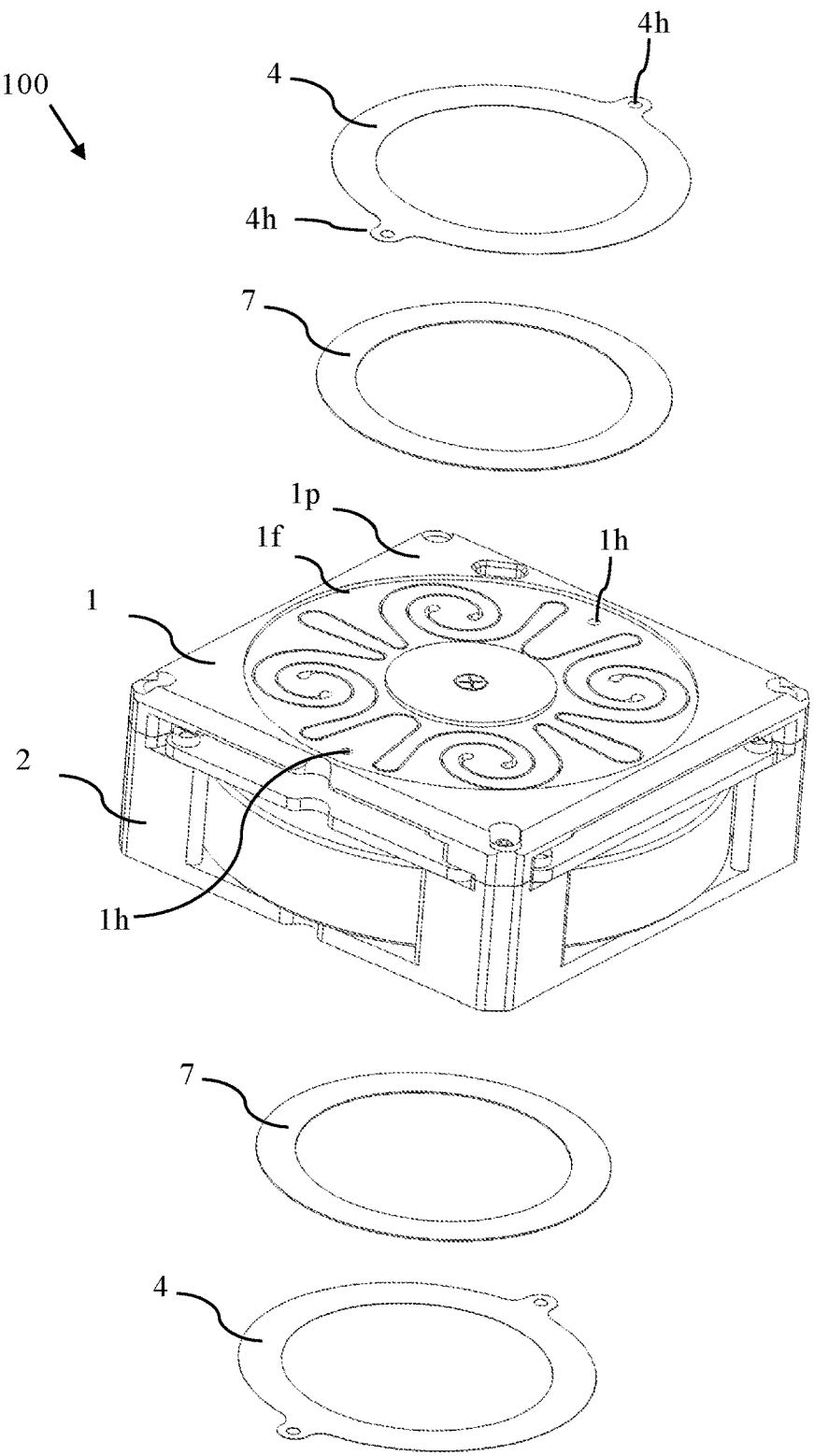
FIG. 3 depicts an exploded view of a reaction wheel assembly, in accordance with an example.

FIGS. 1-5 depict portions of reaction wheel assembly 100. FIG. 1 and FIG. 2 provide perspective views, and FIG. 3 provides an exploded view of reaction wheel assembly 100. Reaction wheel assembly 100 may be coupled to a body, for example a spacecraft bus or spacecraft subcomponent, or any other surface or enclosure. Reaction wheel assembly 100 may further support a rotatable mass, which may be coupled to the assembly via a bearing assembly.

Reaction wheel assembly 100 includes a top housing 1 and a bottom housing 2 which may be assembled together. Top housing 1 includes a substantially planar surface 1p, and bottom housing 2 includes a substantially planar surface 2p, each of substantially planar surfaces 1p and 2p being substantially situated in a respective plane. In the example of reaction wheel assembly 100, the substantially planar surfaces 1p and 2p have substantially square facial surface areas. This is not intended to be limiting, however, as the planar surfaces 1p and 2p may have any shape known to those of skill in the art.

Top housing 1 further includes connecting sections 1c, which may extend away from the substantially planar surface 1, and bottom housing 2 includes connecting sections 2c, which may extend away from substantially planar surface 2. The four pairs of connecting sections 1c and 2c extend away from the four corners of the substantially square planar surfaces 1p or 2p, providing space not only room for the rotatable mass to be positioned between top and bottom housings 1 and 2, but also for the rotatable mass to extend outside the reaction wheel assembly 100 between the connecting sections 1c and 2c. This is not intended to be limiting, however as reaction wheel assembly 100 may include any number of connecting sections 1c and 2c extending from substantially planar surfaces 1p and 2p. In further examples, as will be seen below, connecting sections 1c or 2c may form a solid perimeter, for example a cylinder, that substantially surrounds a rotatable mass. In further examples, only one of top housing 1 or bottom housing 2 may include connecting sections 1c or 2c that extend away from substantially planar surface 1p or 2, respectively. Connecting sections 1c and 2c may be used to couple top housing 1 to bottom housing 2 using a fastener, for example a screw, or any type of fastener known by those of skill in the art. For example, reaction wheel assembly 100 includes four fastener locations 5 that include bores formed in each respective corner of planar surfaces 1p and 2p, passing through connecting sections 1c and 2c. Fastener locations 5 may be used to couple top housing 1 and bottom housing 2 together using a fastener such as a screw. Fastener locations 5 may be further used to couple reaction wheel assembly 100 to a body such as a spacecraft bus.

As may be seen in FIGS. 1-3, reaction wheel assembly 100 may enclose a rotatable mass such as a rotor flywheel 3 between top housing 1 and bottom housing 2. Those skilled in the art will recognize that the examples provided in the Application may be applied to a reaction wheel with inner ring rotation or outer ring rotation.

The center of flywheel rotation is defined by two or more bearings, located within the assembly at location 6. FIG. 1 depicts the axial direction, defined by the rotation axis of the two or more bearings, and the radial direction perpendicular to the axial direction. Launch loads for a reaction wheel assembly 100 attached to a spacecraft may, for example, travel through fastener locations 5, into the bottom housing 2, into the top housing 1, and into the bearings at location 6.

In the example of reaction wheel assembly 100, substantially planar surface 1*p* provides a flexure layer 1*f* and substantially planar surface 2*p* provides planar layer 2*f*. This is not intended to be limiting, however, in examples reaction wheel assembly 100 may include only one flexure layer.

Figure 4:
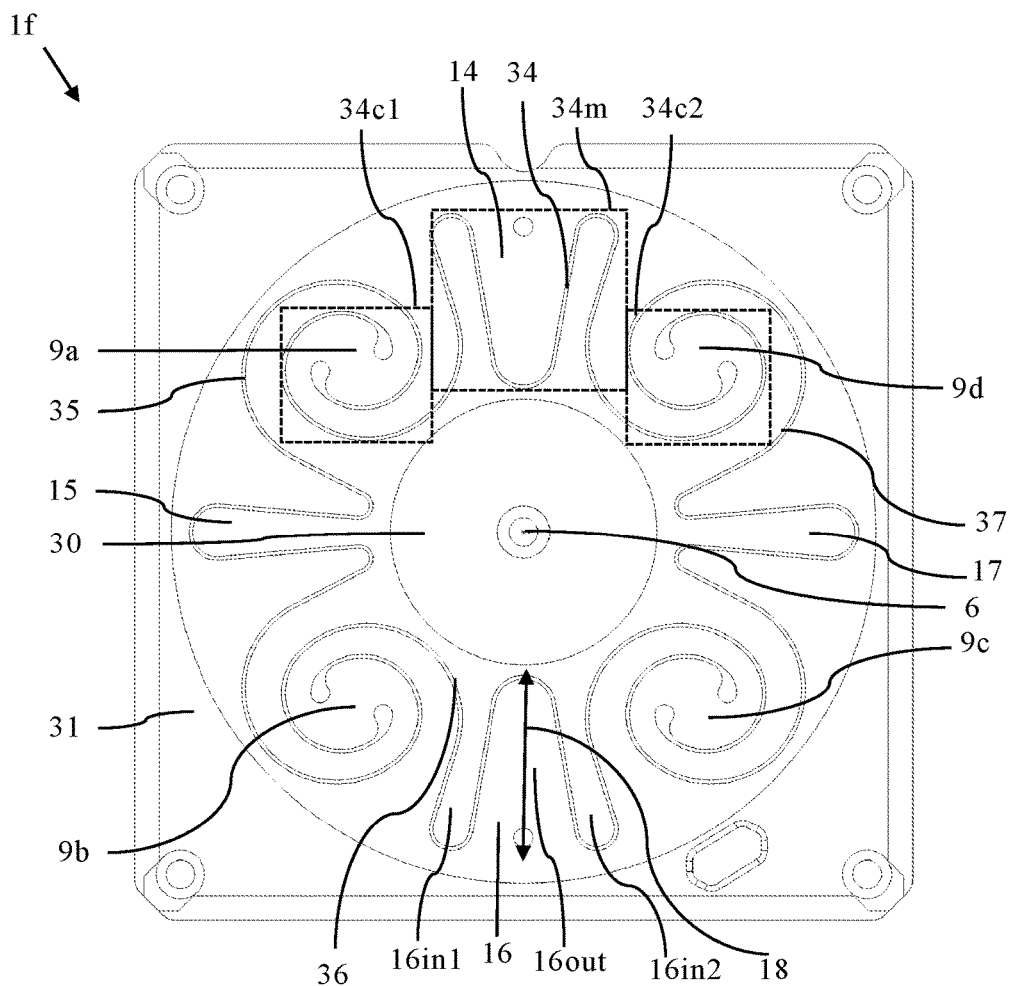
FIG. 4 depicts a plan view of a flexure layer, in accordance with an example.

FIG. 4 provides top view of the flexure layer 1*f* of top housing 1. Flexure layer 1*f* includes flexure elements 9*a*, 9*b*, 9*c*, and 9*d*, distributed substantially equally around an annular disk area around location 6. The flexure elements may help to isolate an inner region 30 from an outer region 31 of flexure layer 1*f*. Outer region 31 is the area of flexure layer 1*f* that is outside the flexure elements 9*a*, 9*b*, 9*c*, and 9*d*. In the example of reaction wheel assembly 100, the outer region 31 is attached to a spacecraft body via fastener locations 5. Inner region 30 is the area of flexure layer 1*f* positioned between location 6 and the annular disk area that includes flexure elements 9*a*, 9*b*, 9*c*, and 9*d*.

In the example of reaction wheel assembly 100, flexure elements 9*a*, 9*b*, 9*c*, and 9*d* are "S" shaped elements formed between portions of serpentine slots 34, 35, 36, and 37. For example, a portion of each of serpentine slots 34 and 35 forms flexure element 9*a*, a portion of each of serpentine slots 35 and 36 form flexure element 9*b*, a portion of each of serpentine slots 36 and 37 forms flexure element 9*c*, and a portion of each of serpentine slots 37 and 34 forms flexure element 9*d*. Serpentine slots 34, 35, 36, and 37 are slot areas where material may have been removed from flexure layer 1*f*, for example by machining, wire electro discharge manufacturing, waterjet, laser cut, photo-etch, or stamping the surface of flexure layer 1*f*. As may be seen in FIG. 5, which represents a perspective view of a cutaway of flexure layer 1*f*, serpentine slots 34, 35, 36, and 37 may pass all the way through flexure layer 1*f*. In further examples, serpentine slots may not pass all the way through, however, or may comprise a stepped profile where flexure layer 1*f* is thinned, but some material remains. In further examples, serpentine slots may combine features that include slots that pass completely through flexure layer 1*f* and steps that do not.

Returning to FIG. 4, it may be seen that in the example of reaction wheel assembly 100 that each of serpentine slot 34, 35, 36, and 37 traces a first "S" shape, a center "M" shape, followed by a second "S" shape. Serpentine slots 34, 35, 36, and 37 are oriented around location 6 of flexure layer 1*f* such that a bottom section of each "M" shape points towards location 6. For example, serpentine slot 34 includes a first "S" shape section 34*c*1, an "M" shape section 34*m*, and a second "S" section 34*c*2, as represented by the dotted lines in FIG. 4. Each first "S" shape section of serpentine slots 34, 35, 36, and 37 interlocks together with an adjacent second "S" shape section of an adjacent serpentine slot to form flexure elements 9*a*, 9*b*, 9*c*, and 9*d*.

Flexure elements 9*a*, 9*b*, 9*c*, and 9*d* may provide for an assembly with a stiffness, flexibility, or compliance in any desired degree of freedom to lower or alter the natural frequency fn of the housing in that selected direction. By providing the flexure elements integral to reaction wheel assembly 100, the natural frequency fn of reaction wheel assembly 100 may be tuned to provide vibration isolation between a spacecraft body and a rotatable mass.

In examples, reaction wheels typically operate between from 0-8,000 RPM, or between 0-133 Hz. In order to reduce dynamic interaction between the reaction wheel assembly and the reaction wheels at the typical speeds, the flexure elements may have a flexibility operable to reduce a natural frequency of the assembly to a value between 150-300 Hz. In further examples, however, the reaction wheels may be biased to a higher speed, and the flexure elements may have a flexibility operable to reduce the natural frequency fn of the assembly to a value between 0-20 Hz. These examples are not intended to be limiting, however. In further examples a flexure element may have any flexibility operable to select any desired natural frequency fn for an assembly.

Reaction wheel assembly 100 may further include one or more damping elements operable to dampen vibrations that pass between a body and a rotatable mass to which reaction wheel assembly 100 is attached. For example, flexure layer 1*f* may include a damping element corresponding to each "M" shaped portion of a serpentine slot: serpentine 34 includes damping element 14, serpentine slot 35 includes a damping element 15, serpentine slot 36 includes a damping element 16, and serpentine slot 37 includes a damping element 17.

Each damping element 14, 15, 16, and 17 may include an inner damping element coupled to the inner region 30, an outer damping element coupled to the outer region 31. For example, it may be seen in FIG. 4 that the damping element 16 formed by serpentine slot 36 forms a pattern defining an inner damping element 16*in*1 coupled to the inner region 30, and an outer damping element 16*out* coupled to the outer region 31. Damping element 16 may further include a second inner damping element 16*in*2. Outer damping element 16*out* may be formed as a finger positioned between first and second inner damping elements 16*in* and 16*in*21, providing a pattern of interlaced fingers, allowing for relative motion between the inner region 30 and the outer region 31 of flexure layer 1*f* over a shearing region 18.

Figure 5:
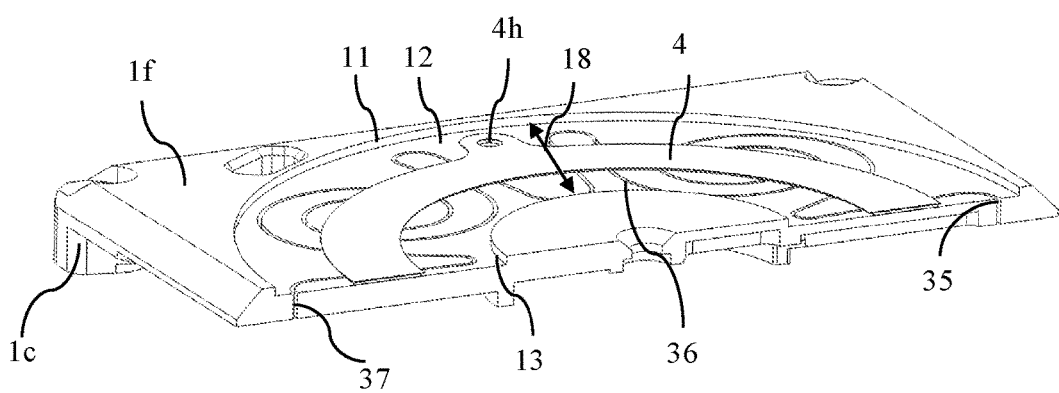
FIG. 5 depicts a section view of a flexure layer, cut through the center of the assembly, in accordance with an example.

As may be seen in FIG. 5, flexure layer 1*f* may include an annular stepped area 12 positioned between an outer lip 11 and an inner lip 13. By positioning the serpentine slots 34, 35, 36, and 37 and damping elements inside annular recessed area 12, it may be possible to further affect the stiffness, flexibility, or compliance of flexure layer 1*f*.

In examples, flexure layer 1*f* may be formed from a high strength metal, such as aluminum, steel, titanium, magnesium, etc. This is not intended to be limiting, however, as flexure layer 1*f* may be formed by any material known to those in the art.

As may be seen in FIGS. 1, and 2, a visco-elastic material (VEM) may further be coupled to the damping elements 14, 15, 16, and 17, positioned adjacent to at least a portion of the shearing region 18. In the example of reaction wheel assembly 100, the VEM is formed into an annular disk-shaped VEM layer 7 that overlaps at least a portion of the inner and outer damping elements 16*in*1, 16*out*, and 16*in*2, providing a surface area for adhesion of the VEM layer 7 over the shearing region 41. The shearing of VEM layer 7 provides damping that may provide further vibration isolation for reaction wheel assembly 100.

The VEM layer 7 may be coupled to the flexure layer 1*f* via a constraint layer 4. In the example of reaction wheel assembly 100, constraint layer 4 is an annular disk of material that covers substantially the same area as the VEM layer 7. In examples, constraint layer 4 may be manufactured from a relatively stiff material compared to the stiffness of the VEM. For example, constraint layer 4 may be manufactured from steel, titanium, or aluminum. In examples, the geometry of the constraint layer 4 may be further modified to introduce additional flexibility or stiffness to reaction wheel assembly 100.

The constraint layer 4 may be coupled or rigidly attached to inner region 30 or outer region 31 of upper housing. For example, as may be seen in FIG. 3, constraint layer 7 may include holes 4h to facilitate the use of fasteners to secure constraint layer 7 to upper housing 1. Flexure layer 1f may further include a borehole 1h in alignment with constraint layer holes 4h to facilitate coupling constraint layer 4. In further examples, however, constraint layer 4 may be coupled to flexure layer 1f using any fastening method known to those of skill in the art.

Further examples may include providing a plurality of VEM layers and constraint layers, which may be affixed to the inner region 30 or outer region 31 of flexure layer 1f, or alternatively float relative to flexure layer 1f. In further examples, VEM layers may be alternated with constraint layers to provide the additional benefit of dividing the VEM thickness into thinner layers, which may provide a more linear damping characteristic.

In examples, VEM layer 7 and constraint layer 4 may each be further modified in thickness, geometry, or material to adjust and change the damping, stiffness, and strength parameters of reaction wheel assembly 100. Constraint layer 4 may be further modified to effect shearing and damping of the VEM. Although FIG. 3 depicts a simplified thin sheet constraint layer 4, this Application contemplates further examples of the constraint layer 4 geometry. For example, by incorporating serpentine flexure cuts into constraint layer 4, additional tailoring of stiffness, damping, and performance of the assembly may be provided.

Although reaction wheel assembly 100 provides the example of four flexure elements and four damping elements, this is not intended to be limiting. Further examples may include any number or shape of flexure elements and damping elements, as will be understood by those of skill in the art. Further examples may also include any number or shape of serpentine slots. Moreover, the spacing, the geometry, shape, thickness, material, and length of the serpentine slots may be further tailored to form flexure and damping elements for a particular vibration environment, launch vehicle, and/or reaction wheel mass.

The sharing of load between the flexure elements and the damping elements may add significant damping to the assembly. As the vibration loading is transmitted through the one or more flexure elements, it may be additionally transmitted into one or more damping elements.

By tailoring the flexure elements and damping elements, the resonant frequency, strength, stiffness and damping at each respective flexure and damping element may be further adjustable for each of six degree of freedom, including translations about the X, Y, and Z axis in addition to rotations about the three orthogonal directions. The flexure elements and damping elements may therefore reduce transmitted vibration to the reaction wheel bearings due to the launch vibration, and reducing the transmitted disturbances from the reaction wheel to the spacecraft.

In the example of reaction wheel assembly 100, serpentine slots 34, 35, 36, and 37 are integrally machined to define an integrated series of flexure elements and damping elements. In further examples, however, it is contemplated that the housing and flexure elements may be manufactured out of different or multiple components that are coupled or affixed together.

Figure 6:
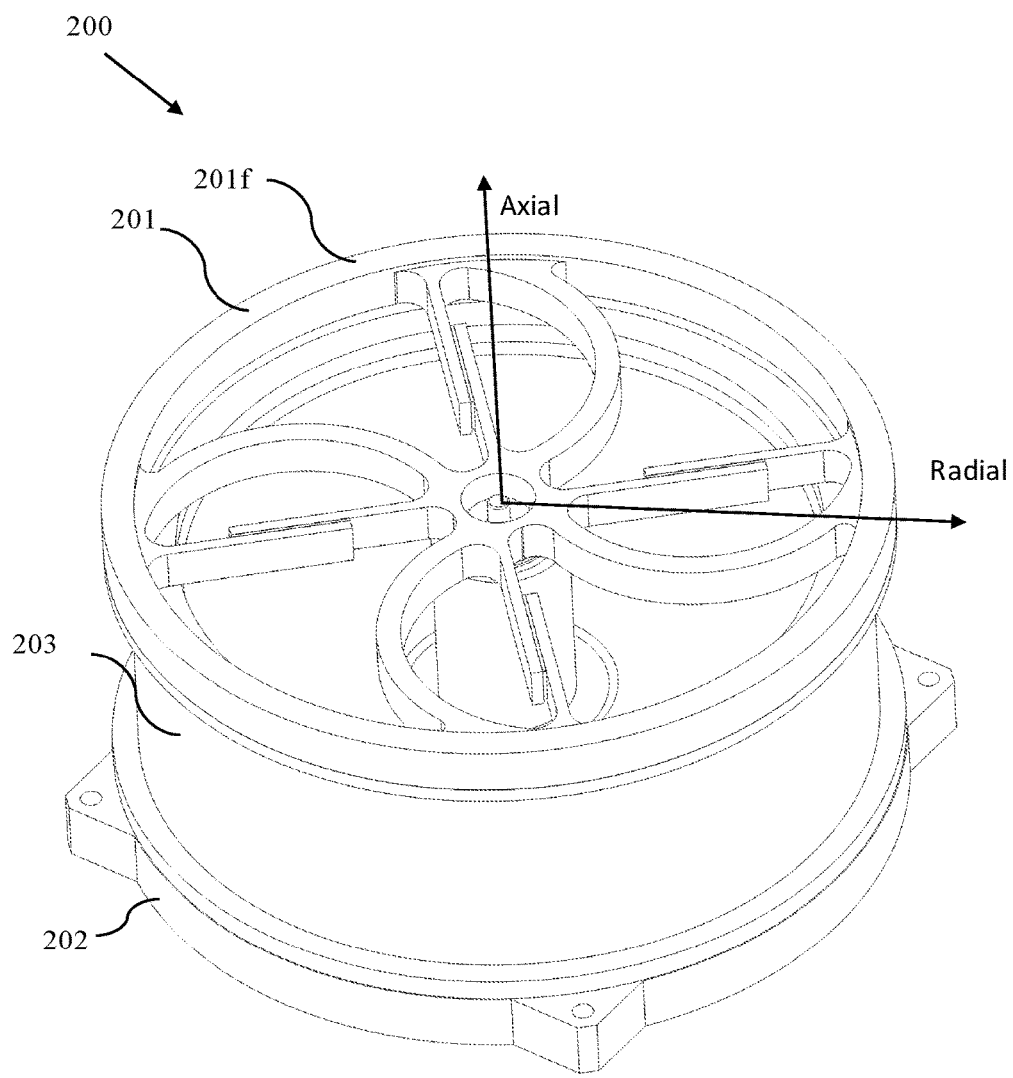
FIG. 6 depicts a perspective view of a reaction wheel assembly, in accordance with an example.
Figure 7:
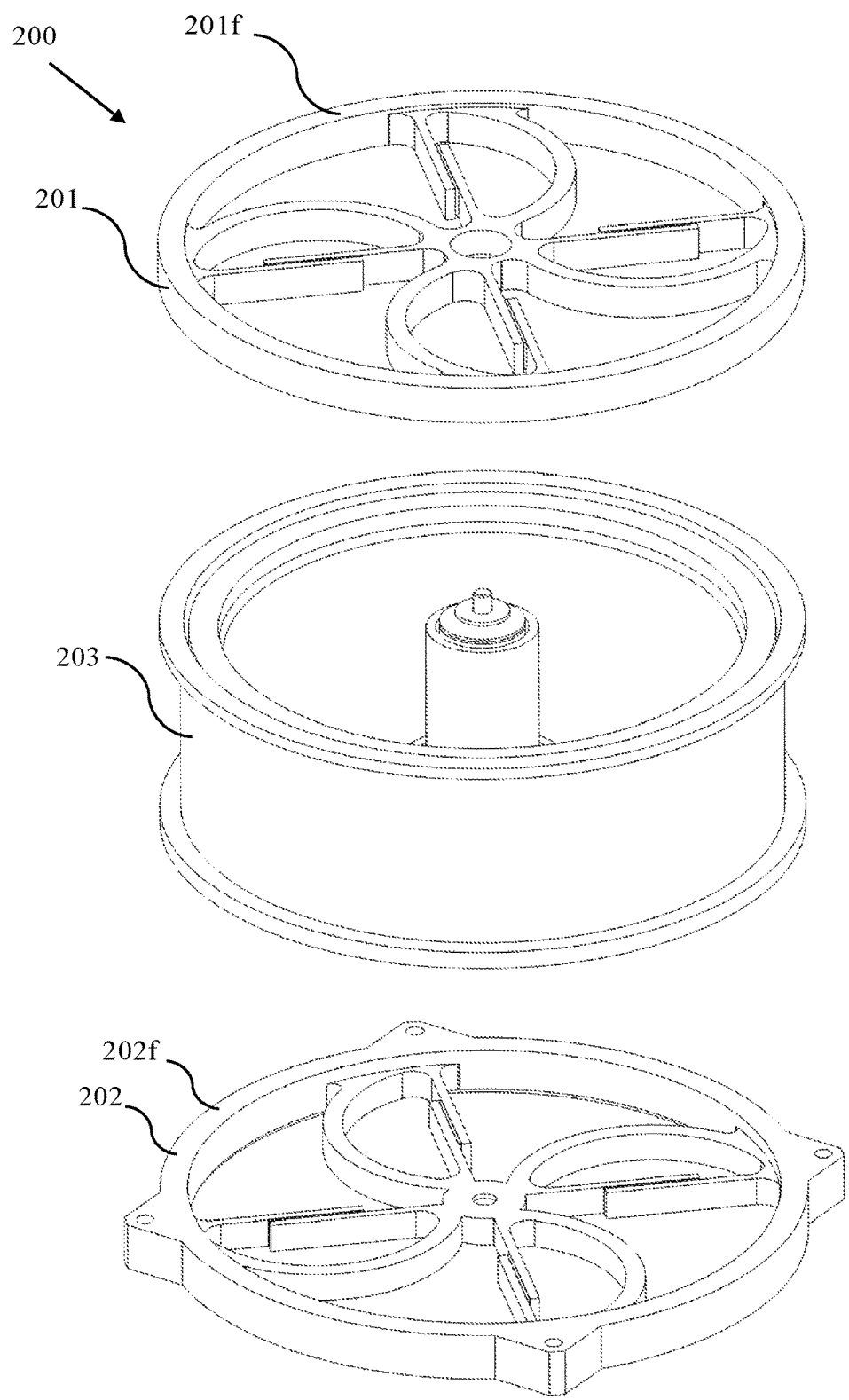
FIG. 7 depicts an exploded view of a reaction wheel assembly, in accordance with an example.
Figure 8:
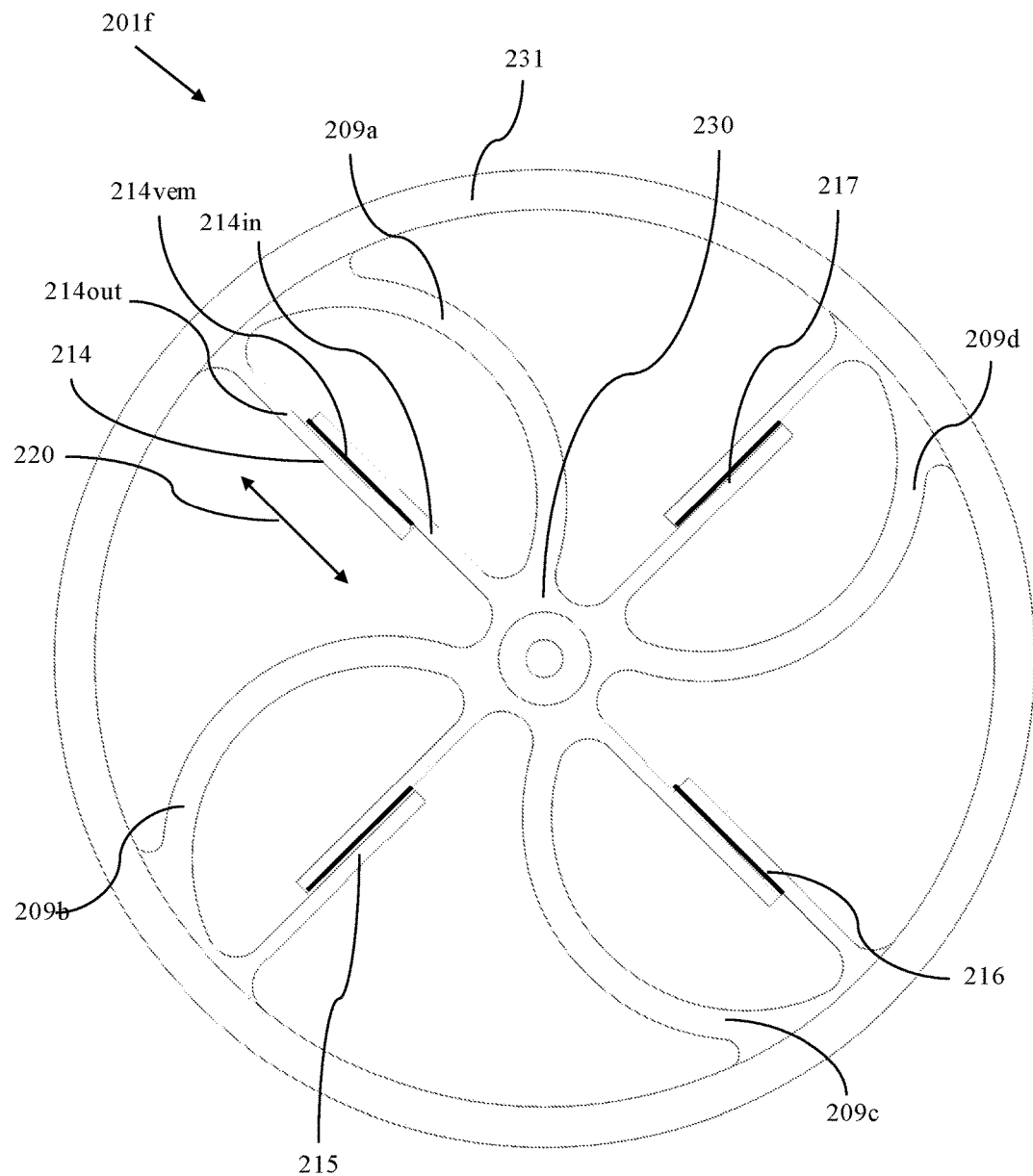
FIG. 8 depicts a plan view a reaction wheel assembly, in accordance with an example.

FIGS. 6-8 depict a further example reaction wheel housing 200. FIG. 6 provides a perspective view and FIG. 7 provides an exploded view of reaction wheel 200, which includes a top housing 201, a rotor flywheel 203, and a bottom housing 202. Top and bottom housings 201 and 202 are substantially planar surfaces with substantially circular faces. Top housing 201 includes a flexure layer 201f, and bottom housing 202 includes a flexure layer 202f. This is not intended to be limiting, however, as either top or bottom housing 201 or 201 may not include a flexure layer, or may include a different flexure layer.

As may be seen in FIG. 8, flexure layer 201f includes flexure elements 209a, 209b, 209c, and 209d. Each of flexure elements 209a, 209b, 209c, and 209d are coupled to an inside region 230 of the flexure layer 201f at a first end and to an outside region 231 of the flexure layer 201f at a second end. Flexure elements 209a, 209b, 209c, and 209d may be bow-shaped, as depicted, or they may include a plurality of wavy or rectilinear flexures operable to provide additional flexibility in the radial, axial, and moment directions. While flexure layer 1f included serpentine slots that formed the flexure elements, the flexure elements 209a, 209b, 209c, and 209d of flexure layer 201f are formed between wider gaps of material in flexure layer 201f.

Flexure layer 201f may further include damping elements 214, 215, 216, and 217. Each respective damping element 214, 215, 216, and 217 may include an inner damping element attached to the inner region 230 and an outer damping element attached to the outer region 231 of flexure layer 201f. For example, damping element 214 includes an inner damping element 214in and an outer damping element 214out. Inner and outer damping elements 214in and 214out may be formed as fingers, or elongated and flattened rectangular pieces designed to be rigid in at least one of the axial and radial directions. In examples, inner and outer damping elements 214in and 214out may be most flexible in the tangential (rotational) direction, thereby preventing the damping element from contributing significantly to the overall stiffness of the assembly and preventing the flexure elements 209a, 209b, 209c, and 209d from attaining the proper stiffness.

Inner damping element 214in may overlap with outer damping element 214out over a shearing region 220, where a VEM 214vem may be positioned between inner damping element 214in and outer damping element 214out. Damping elements 214, 215, 216, and 217 may provide maximum damping due to relative motion in both the radial and axial direction. In examples, the VEM 214vem may be a single thick layer, or it may be subdivided into a plurality of thinner layers by laminating thin sheets of VEM to a linear elastic material, such as a thin sheet of metal. Differential motion between inner and outer damping elements 214in and 214out may create shearing and damping in the VEM 214vem.

While reaction wheel assembly 200 includes four flexure elements 209a, 209b, 209c, and 209d, and four damping elements 214, 215, 216, and 217, this is not intended to be limiting. This Application anticipates further quantities, shapes, geometries, materials, widths, lengths, depths of the flexure and damping elements, which may be tailored to provide specific axial and radial stiffness for vibration isolation of various sizes and types of reaction wheels, in addition to various spacecraft launch loads.

In examples, flexure elements 209a, 209b, 209c, and 209d and damping elements 214, 215, 216, and 217 may be manufactured into a single integrated flexure layer 201f or may be manufactured as separate pieces that may be coupled together.

In further examples, flexure elements 209a, 209b, 209c, and 209d may be constructed from a layered laminate of VEM and linear elastic (such as metallic) elements, such that damping features are integrated into the flexure element structure.

Figure 9:
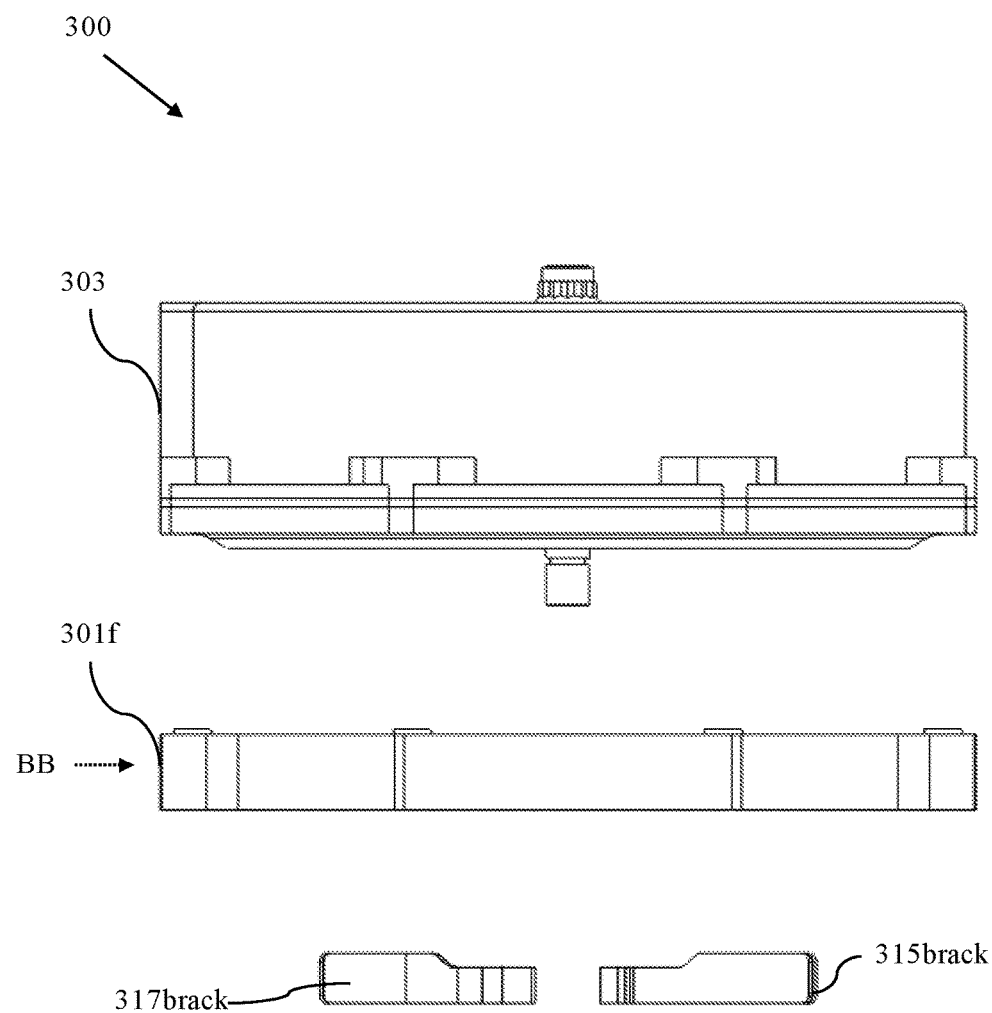
FIG. 9 depicts an exploded view of a reaction wheel assembly, in accordance with an example.
Figure 10:
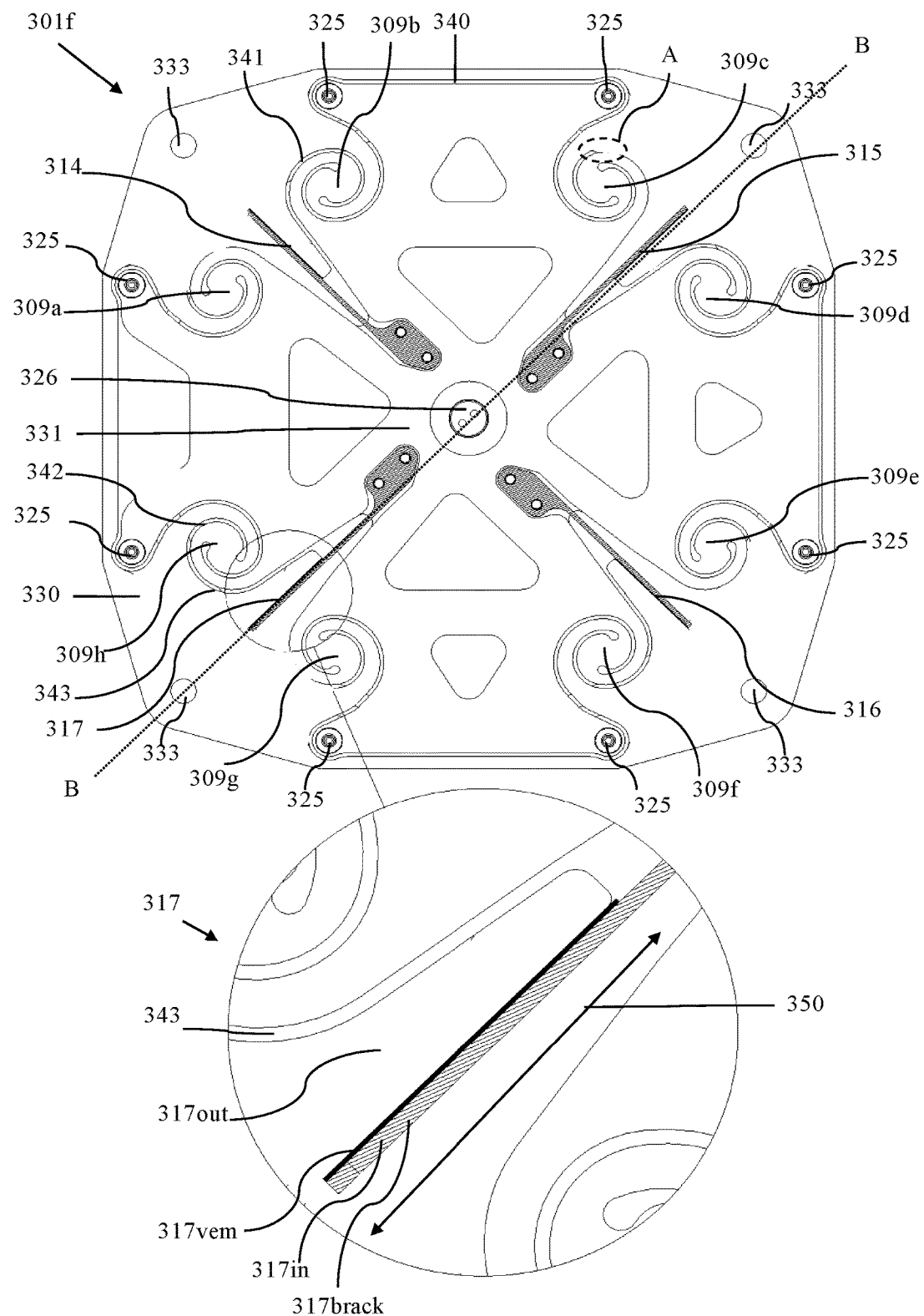
FIG. 10 depicts a plan view of a reaction wheel assembly, in accordance with an example.

FIGS. 9-10 depict a further example reaction wheel assembly 300. FIG. 10 depicts a plan view of flexure layer 301f, and FIG. 9 depicts an exploded view of the cross section of reaction wheel assembly 300 marked BB in FIG. 10. Reaction wheel assembly 300 includes rotatable flywheel standalone unit 303, including a rotor flywheel inside a housing. Standalone unit 303 couples to flexure layer 301f, which further couples to a spacecraft body.

Flexure layer 301f includes an outer region 330 of flexure layer 301f operable to be coupled to a spacecraft body or other body. For example, to facilitate coupling to the surface of a body, flexure layer 301f may include fastener locations 333 in outer region 330. Flexure layer 301f also includes an inner region 331 operable to be coupled to the rotatable mass, or to standalone unit 303. Inner region 331 may be coupled to standalone unit 303 via bearings at position 326. Inner region 331 may further be coupled to standalone unit 303 via the eight attachment locations 325 identified in FIG. 10. In examples, the numbers and locations of attachment locations 333 and 325 may vary as alternate flexure layer and flexure element designs necessitate.

Flexure layer 301f includes eight flexure elements 309a, 309b, 309c, 309d, 309e, 309f, 309g, and 309h that separate the inner and outer regions 330 and 331, each of which are formed by a combination of two serpentine slots. For example, flexure element 309b is formed between serpentine slots 340 and 341. Serpentine slot 340 includes a substantially straight central portion positioned approximately parallel to the proximate outside edge of flexure layer 301f. Serpentine slot 340 includes a first curl-shaped portion at a first end, inside flexure element 309b. Serpentine slot 340 includes a second curl-shaped portion at a second end, inside flexure element 309c. Serpentine slot 341 includes a curl-shape that interlocks with the first curl-shape portion of serpentine slot 340 to form the "S" shaped flexure element 309b. Flexure elements 309a, 309c, 309d, 309e, 309f, 309g, and 309h are similarly formed between two respective serpentine slots in flexure layer 301f.

Like reaction wheel assembly 100, the serpentine slots that compose flexure elements 309a, 309b, 309c, 309d, 309e, 309f, 309g, and 309h may include regions where the serpentine slot passes through the entire depth of flexure layer 301h, or through only part of the depth of flexure layer 301f to form "steps". For example, the dotted circle labeled A in FIG. 10 identifies an area where a serpentine slot transitions between a stepped portion, where the serpentine slot is represented by a single line, and a slit passing through both faces of the flexure layer, represented by a double line. By varying the depth of a serpentine slot, or any portion of flexure layer, it may be possible to further determine the flexibility of a flexure or a damping element.

Flexure layer 301 further includes four damping elements 314, 315, 316, and 317. Each damping element 314, 315, 316, and 317 includes an inner damping portion, an outer damping portion, and a VEM. For example, FIG. 10 includes an inset detail of damping element 317. Damping element 317 includes inner damping portion 317in, which is formed by an inner damping bracket 317brack. Inner damping bracket 317brack is rigidly coupled to inner portion 331 of flexure layer 301f. As may be seen in the exploded view of flexure layer 301f provided in FIG. 9, inner damping bracket 317brack includes an adhesion area oriented substantially perpendicular to the face of flexure layer 301f. Damping element 317 further includes outer damping portion 317out, which is formed between serpentine slot 343 and inner damping bracket 317brack. Outer damping portion 317out also includes an adhesion area oriented substantially perpendicular to the face of flexure layer 301f. Between the adhesion areas of the inner damping portion 317in and the outer damping portion 317out, a VEM 317vem provides damping over shearing region 350.

In the example of reaction wheel assembly 100, the damping elements 314, 315, 316, and 317 may be intrinsic to the structure of flexure layer 301f. In further examples, however, the inner damping brackets associated with each of damping elements 314, 315, 316, and 317, such as inner damping bracket 317brack, may be formed as a bulk three dimensional part that is rigidly attached to the inner region, or the sprung portion of flexure layer 301f baseplate. Similarly, in further examples inner damping brackets associated with each of damping elements 314, 315, 316, and 317 may be formed as a standalone assembly that may be rigidly attached to the assembly. In examples, the inner damping brackets associated with damping elements 314, 315, 316, and 317 may be formed from titanium, or any other stiff material known to those of skill in the art.

In examples, damping elements 314, 315, 316, and 317 may further include an outer damping bracket. For example, damping element 317 may include an outer damping bracket positioned between outer damping bracket 317out and VEM 317vem.

In examples damping elements 314, 315, 316, and 317 may include a second VEM. For example, damping element 317 may include a second VEM adjoining the side of the inner damping bracket 317brack opposite VEM 317vem.

Example flexure layer 301 provides four pairs of flexure elements with a damping element positioned between each pair. This not intended to be limiting, however. In examples, further arrangements, orientations, and geometries of flexure elements and damping elements may be used to provide the desired flexibility of reaction wheel assembly 300, as discussed above with respect to reaction wheel assemblies 100 and 200.

Advantageously, reaction wheel assembly 300 may provide vibration isolation between the spacecraft body and the bearings of the rotatable flywheel via a sprung plate at one end of reaction wheel assembly 300.

Figure 11:
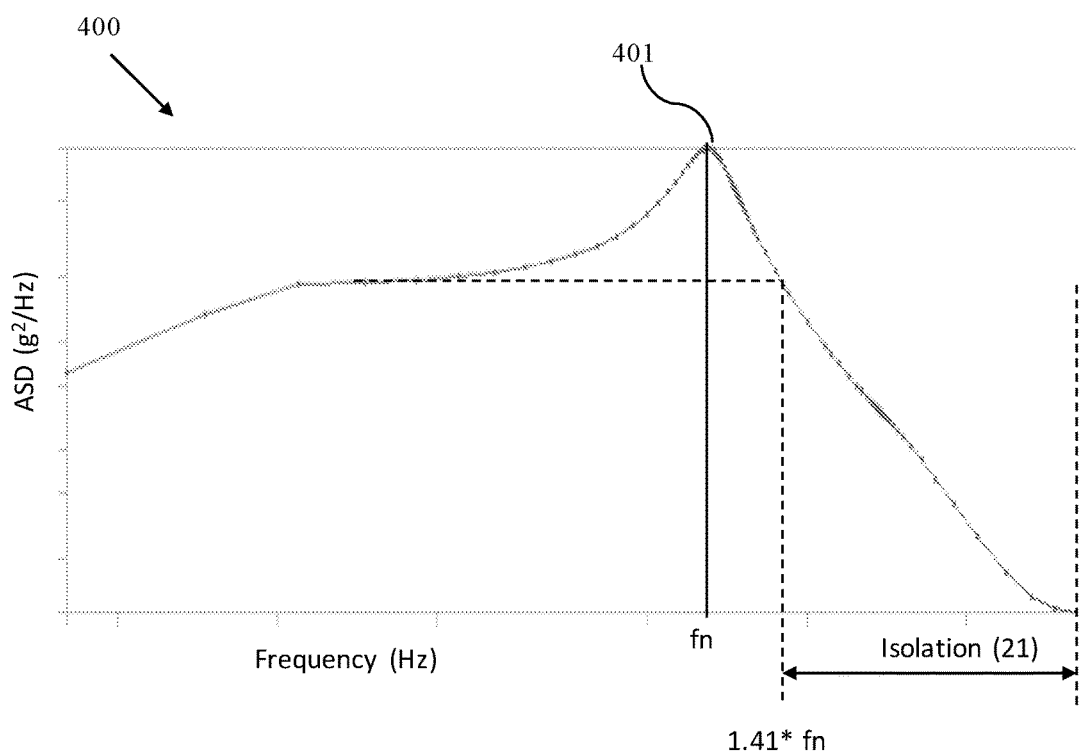
FIG. 11 depicts a plot of a resonant frequency response, in accordance with an example.

FIG. 11 depicts a random vibration response plot 400 at the center location 326 of the reaction wheel assembly 300, where standalone unit 303 is connected to the assembly via bearings. The x-axis of vibration response plot 400 represents frequency, and the y-axis represents acceleration spectral density. Plot 400 shows the peak 401 of the resonant frequency fn, which as described above, can be tailored to be either lower or higher by making adjustments to the flexure elements, as discussed above. As may be seen in plot 400, above 1.414×fn significant vibration attenuation is achieved. The height of the resonance peak 401 is determined by the damping in the system, and can be tailored by adjusting damping elements, as is also discussed above.

Figure 12A:
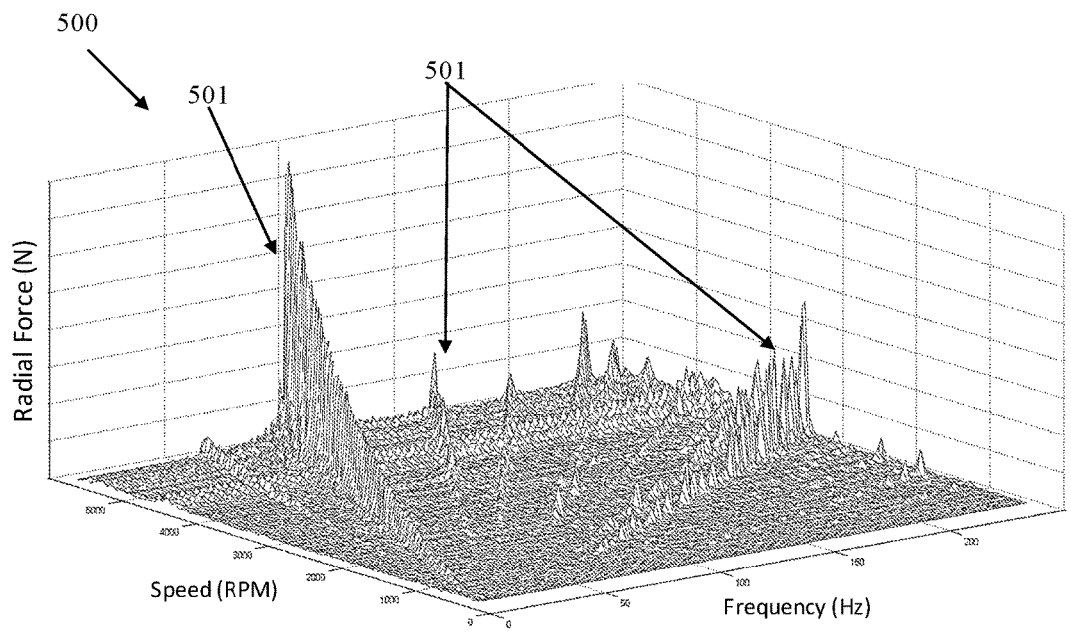
FIGS. 12a and 12b depicts a plot of jitter isolation characteristics, in accordance with an example.
Figure 12B:
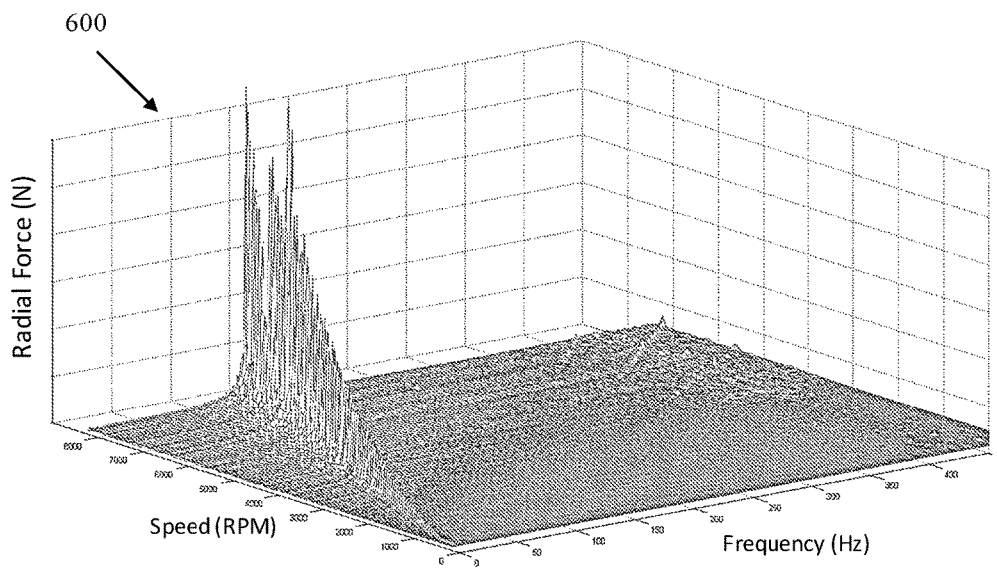

FIG. 12a depicts a radial force plot 500 of prior reaction wheel designs, and FIG. 12b depicts a radial force plot 600 from reaction wheel assembly 300. The x-axes of plots 500 and 600 represent frequency in Hz, the y-axes represent speed in revolutions per minute, and the shading represents the radial force in Newtons. In radial force plot 500, it may be seen that, as the as the prior design reaction wheel assembly speed is increased from 0 to top speed (0-10,000 RPM), a pattern of vibration is emitted at higher multiples of the wheel speed. For example, wheel imbalance 501 is due to slight imbalance in the reaction wheel rotor. Higher frequency harmonics 502 are caused by the wheel imbalance interacting with structural resonances. Plot 600, however, depicts dramatic improvement at higher frequencies. In summary, the examples of the Application may minimize both launch vehicle induced vibration from being transmitted into the bearings, and may also be effective at reducing micro-vibrations generated by the bearings from being transmitted to the spacecraft.

What is claimed is:

1. An assembly for coupling a rotatable mass to a body, the assembly comprising:
    a flexure layer comprising:
    an inner region operable to be coupled to the rotatable mass via a bearing assembly;
    an outer region operable to be coupled to the body;
    a flexure element including a first end coupled to the inner region and a second end coupled to the outer region
    a damping element including an inner damping element coupled to the inner region, an outer damping element coupled to the outer region; and
    a visco-elastic material (VEM) coupled to the flexure layer adjoining the inner damping element and the outer damping element.

2. The assembly of claim 1, wherein the flexure element has a flexibility operable to reduce a natural frequency of the assembly below 330 Hz.

3. The assembly of claim 1, wherein the flexure element has a flexibility operable to reduce a natural frequency of the assembly below 20 Hz.

4. The assembly of claim 1, wherein the flexure element is formed between one or more serpentine slots in the flexure layer.

5. The assembly of claim 4, wherein each serpentine slot of the one or more serpentine slots is substantially uniform in width.

6. The assembly of claim 1, wherein the flexure element is s-shaped.

7. The assembly of claim 1, wherein the flexure element is bow-shaped.

8. The assembly of claim 1, wherein the inner damping element and the outer damping element are formed between one or more serpentine slots in the flexure layer.

9. The assembly of claim 8, wherein the inner damping element is an inner bracket attached to the inner region.

10. The assembly of claim 1, wherein the inner damping element is formed as an inner finger and the outer damping element is formed as an outer finger, the inner finger adjoining the outer finger.

11. The assembly of claim 1, wherein the inner damping element is an inner finger and the outer damping element is a first outer finger and a second outer finger, the inner finger interlaced between the first outer finger and the second outer finger.

12. The assembly of claim 1, wherein the VEM is positioned between the inner damping element and the outer damping element.

13. The assembly of claim 1, further comprising:
    a constraint layer coupling the VEM layer to the flexure layer.

14. The assembly of claim 13, wherein the constraint layer is an annular disk.

15. The assembly of claim 1, wherein the flexure element and the damping element are in the same plane as the flexure layer.

16. A method for coupling a rotatable mass to a body, the method comprising:
    coupling an inner region of a flexure layer comprising the inner region, a flexure element, a damping element, an outer region, and a damping element to a rotatable body, the flexure element having a first end coupled to the inner region and a second end coupled to the outer region and the damping element including an inner damping element coupled to the inner region, an outer damping element coupled to the outer region;
    coupling the outer region to the body; and
    coupling a visco-elastic material (VEM) to the inner damping element and the outer damping element of the damping element over a shearing region.

17. The method of claim 16, the method further comprising:
    coupling a constraint layer to the flexure layer, the VEM positioned between the flexure layer and the constraint layer.

18. A method for manufacturing a flexure layer operable to isolate vibrations between a rotatable mass and a body, the method comprising:
    forming a flexure layer;
    removing material from the flexure layer to form a flexure element, the flexure element including a first end coupled to an inner region of the flexure element and a second end coupled to an outer region of the flexure element;
    removing material from a damping region of the flexure layer to form a damping element including an inner damping element coupled to the inner region, an outer damping element coupled to the outer region; and
    coupling a visco-elastic material (VEM) to the inner damping element and the outer damping element of the damping element over a shearing region.

* * * * *